Patented July 19, 1949

2,476,654

UNITED STATES PATENT OFFICE 2,476,654

PREPARATION OF ALKALINE EARTH FLUOROPHOSPHATE PHOSPHORS BY COPRECIPITATION

Herman C. Froelich, Cleveland Heights, Ohio, assignor to General Electric Company, a corporation of New York No Drawing. Application May 5, 1945, Serial No. 592,277

5 Claims. (Cl. 252—301.4)

1

This invention relates to electric discharge lamps and devices with associated luminescent materials or phosphors that are excitable to fluorescence by the discharge or rays produced in the devices, and particularly to such luminescent or fluorescent materials and their preparation. The invention is applicable to the preparation of fluorescent compositions of metal halophosphate matrices and activating metals, and is hereinafter explained in detail in connection with the activated alkaline earth metal halophosphates disclosed in U. S. application Serial No. 538,559 of Alfred H. McKeag and Peter W. Ranby, filed June 2, 1944, now abandoned, and assigned to the assignee of this application. Besides affording a more convenient and advantageous method of preparing these phosphors, my invention has yielded products of superior luminescent brightness.

In general, halo-phosphates are compounds more or less analogous to the natural mineral apatite, and are supposed to be represented by a formula such as $3M_3(PO_4)_2 \cdot 1M'L_2$, where L represents a halogen or a mixture of halogens, and M and M' represent either different or identical bivalent metals or mixtures of such metals. Halophosphates here especially in question are artificial substances (compounds or complexes) comprising as essential lattice constituents one or more bivalent Group II metals, the phosphate radical (PO4), and one or more halogens, and having a lattice structure similar to that of apatite, i. e., a structure whose difference from that of apatite is no greater than might be expected to result (a) from the partial or complete substitution of another alkaline earth metal or another halogen for those found in apatite, or (b) from the introduction of an activator. In some cases, the lattice structure of such phosphors may also include oxide(s) of such metal.

Generally speaking, artificial halo-phosphates are most suitable as phosphors when at least half of the bivalent metal atoms or ions are alkaline earth metals of the group comprising calcium and strontium (i. e., calcium or strontium atoms), while at least half of the halogen atoms are of the group comprising fluorine, chlorine, or bromine (i. e., fluorine atoms, or chlorine atoms, or bromine atoms, or a mixture of atoms of two or more of these three halogens); this halo-phosphate being activated by an activator whereof part at least is preferably antimony, though if desired antimony may be replaced partly or wholly with bismuth as the activator, or with tin or lead. Several activator metals of this character may be used together, as, for example, antimony and bismuth, lead and tin; and such activating metal of the tin, lead, antimony, bismuth group (which are the Group IV and Group V metals in the odd numbered 7th and 11th Series

2 of the Periodic System) may be supplemented with manganese, as explained hereinafter.

The proportion of activating antimony can be varied within wide limits, say from ½ per cent to 15 per cent by weight, without any great change in the luminescent properties of the material; but proportions much outside this range decrease the luminescent efficiency. In general, the optimum proportion is usually within a range of 2 to 6 per cent. The color of the light under 2537Å. excitation is a pale blue not very different from that of magnesium tungstate, or even a green blue in some cases.

When bismuth wholly or partially replaces antimony, the proportion of activating bismuth should generally be greater than the amount of antimony replaced; thus while 2 to 6 per cent of antimony is preferred, the preferred amount of bismuth when no antimony is present may be as high as 7½ per cent. Suitable proportions of tin and of lead are 4 per cent and 15 per cent, respectively, with either of which may be used 2½ per cent manganese as a supplemental activator.

In general, indeed, halophosphate phosphors may contain manganese along with the primary activator(s) above indicated. In fact, one of the most advantageous features of luminescent materials activated with antimony or other metal(s) according to the invention is the wide range of color through which the light produced can be varied by varying the proportion of supplemental manganese employed. In general, increasing percentages of manganese with antimony increase the wavelength of the dominant hue from pale blue or green-blue through cream to white with a yellowish, pinkish, or orange tinge to yellow, orange, or even red. With tin and lead, likewise, increasing amounts of supplemental manganese from zero up to a limit commonly less than 10 per cent generally shift the color of the luminescent light toward red, and usually increase its intensity. With bismuth, however, the effect of supplemental manganese is rather different: it often produces little or no change in color, but it may increase the efficiency of luminescence appreciably. But while manganese is thus valuable as a modifying or supplemental activator, it is doubtful whether it should be considered a primary activator, since under excitation of halo-phosphate by 2537Å. radiation, at any rate, manganese without other activator produces little if any luminescence.

The starting materials for the preparation of the phosphor should all be of highest commercial purity, such as reagent grade. Chlorides and bromides of the alkaline earth metals and antimony trioxide may be used as bought; but it must be remembered that these "dry" chlorides and bromides as bought usually contain an appreciable amount of water, which is not deleterious but must be taken into account in determining the amount of halide M'L₂ that is actually introduced. Water used in preparing or washing intermediate products or the final phosphor should generally be distilled water.

To produce activated alkaline earth metal halophosphate phosphor according to my invention, an intimate mixture comprising halide and phosphate of such metal and phosphate of desired activating metal is heated to a sufficient temperature to synthesize the halophosphate matrix and to bring the activating metal into activating relation with this matrix, for it is metal atoms that activate the matrix, rather than the compound thereof in the mixture, or even that in the phosphor itself. Suitable temperatures are from about 1000° C. ot 1150° C., with a general preference for temperatures nearer 1000° C. than 1150° C.; though for phosphors comprising tin or lead as activators, around 1100° C. may be preferred. In preparing fluorophosphate phosphors, especially, I precipitate halide and phosphate components of such mixture together from a common solution of soluble compound of alkaline earth metal, and segregate the resulting halide and phosphate in intermixture from the residual solution. The difficulty in assuring that the alkaline earth metal phosphate thus precipitated shall consist essentially or entirely of the desired normal orthophosphate for forming the halophosphate may be practically obviated by afterward mixing with the segregated mixture sufficient alkaline earth metal compound to convert the undesired other phosphate of the precipitate to normal orthophosphate during heating of the total mixture to form the phosphor, as above mentioned.

The preferred procedure in effecting precipitation as just outlined is to add to a solution of alkaline earth metal compound the other component materials employed in liquid dispersion, i. e., in solution or suspension. To obviate any undesired reactions that might occur amongst these other components if themselves brought together before addition to the solution of alkaline earth metal compound, and might interfere with or prevent the desired reactions, some or all of these other components may be added in separate solutions or suspensions.

As a concrete illustration of my invention for the assistance of those desiring to practice it, but not as defining or limiting the invention in its broader aspects, I shall now describe in detail the production of a calcium fluorophosphate activated with antimony and maganese.

Dissolve 240 grams calcium nitrate,

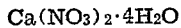

$Ca(NO_3)_2 \cdot 4H_2O$ in 700 cc. of water, and bring the solution to a boil. To this add a hot solution (e. g., at 60° C.) of 11.5 grams ammonium fluoride, $NH_4F$, forming a colloidal precipitate of calcium fluoride, $CaF_2$, and boil for five minutes. Next add (either successively or together) 4 grams of antimony trioxide, $Sb_2O_3$, in aqueous suspension and about 15 to 25 cc. (more or less) of aqueous manganese nitrate solution, 50% $Mn(NO_3)_2$. Then add a boiling hot aqueous solution of diammonium phosphate, comprising 110 grams of $(NH_4)_2HPO_4$ in 700 cc. water, thus co-precipitating phosphates of manganese, and calcium, and bringing the colloidal $CaF_2$ and the finely dispersed $Sb_2O_3$ down with them. As soon as the mixed precipitate becomes crystalline, the whole batch is shaken thoroughly, and then filtered to segregate the mixed precipitate from the residual solution or liquid. The precipitate is thoroughly washed with water on a suction filter, dried at about 200° C., and crushed to a fairly fine powder. This is mixed with 50 grams of calcium carbonate, $CaCO_3$, and the total mixture is ball-milled for say half an hour, or sifted several times through a 150 mesh sieve, in order to assure thorough intermixture of all the components, as well as freedom from lumps or coarse particles. It is then ready for heating or firing.

For this purpose, the mixture may be placed in a quartz tube and heated in an electric tube furnace at about 1050 to 1100° C. for about half an hour, in an atmosphere of inert gas, particularly dry nitrogen, continually passing through the quartz tube. The temperature of firing may approach as nearly as feasible to that at which the mixture begins to sinter, but should never get high enough to melt the mix. After cooling off in the nitrogen atmosphere, the product is crushed and ball-milled or sifted as before firing, thoroughly washed with water, and dried at about 160° C., when it is ready for use.

The proportions in the foregoing description represent an excess of some 20 to 30% of CaF over the approximate 3 to 1 mol ratio of $Ca_3(PO_4)_2$ and $CaF_2$ in a true halophosphate such as natural apatite, and also an excess of $CaCO_3$ which renders the fluorophosphate slightly basic. These excesses correspond to those in the corresponding fluorophosphate phosphor disclosed in the McKeag and Ranby application, and are practically unavoidable in producing a fluorophosphate as there described, since without them a stoichiometric fluorophosphate does not form. But too much excess $CaCO_3$ tends to cause disintegration of the phosphor, while the excess $CaF_2$ undesirably fluxes the mixture in firing, so that the latter tends to sinter or melt rather easily.

With the method of precipitating the calcium fluoride and phosphate from a common solution as described above, however, the excess $CaF_2$ and $CaCO_3$ can be avoided, and other advantages secured. When the calcium phosphate is precipitated in the presence of the colloidally suspended $CaF_2$, which is itself too fine to be filtered out of the solution, the fine $CaF_2$ particles are as it were "adsorbed" on the filterable particles of calcium phosphate, so that there is no difficulty in afterward filtering the $CaF_2$ out of the solution. Highly reactive on account of its fineness, and in the most intimate intermixture and contact with the calcium phosphate, no excess of $CaF_2$ or of $CaCO_3$ over stoichiometric proportions is needed to assure formation of a stoichiometric halophosphate. Accordingly, the amount of $NH_4F$ added to the calcium nitrate solution as above described may be reduced to 9.2 grams instead of 11.5, and the amount of $CaCO_3$ mixed with the precipitates before firing may be reduced to 40 grams instead of 50.

By firing the total mixture in an inert atmosphere, a single firing suffices, as against the double firing with intermediate grinding that is described in the McKeag and Ranby application. In the case of halophosphate containing manganese, the nitrogen atmosphere or the like also prevents the formation in the phosphor of manganic phosphate or other compound in which manganese is more than divalent; and so the phosphor fluoresces more brightly. Manganic phosphates form rather readily in oxygen or air at the firing temperatures above indicated, or even during the cooling of the product from around 1100° C. down to ambient or ordinary room temperature of some 20° C., and they not only reduce the fluorescence of the product, but tend to give it a purple tinge when the unexcited phosphor is looked at by ordinary daylight. Even when the material is heated or fired in air, some improvement of the color and fluorescent brightness of the product is obtained by transferring it at top temperature to an atmosphere of nitrogen and letting it cool down in the nitrogen.

Both the main improvements hereinbefore described (coprecipitation, and firing in an inert environment) are applicable to halophosphates activated with the other metals mentioned above (bismuth, tin, or lead), as well as to halophosphates whose alkaline earth metal comprises strontium.

What I claim as new and desire to secure by Letters Patent of the United States is:

1. The method of preparing fluorescent alkaline earth metal fluorophosphate which comprises preparing an aqueous solution of a water-soluble alkaline earth metal salt, adding thereto a volatile water soluble inorganic fluoride which reacts with part of the said alkaline earth metal and forms therewith an insoluble fluoride, adding an aqueous dispersion of compound of at least one activator metal of the group consisting of antimony, bismuth, tin and lead and mixtures of at least one said metal with manganese, adding a water soluble inorganic phosphate compound which will react with further amounts of the said alkaline earth metal to precipitate a phosphate thereof and bring down therewith the said insoluble alkaline earth metal fluoride and compound of said activator metal, drying and crushing the resultant precipitate to a fine powder, mixing the said powder with sufficient carbonate of said alkaline earth metal to give the corresponding orthophosphate upon ignition, and firing the mixture at a temperature of approximately 1000–1150° C.

2. The method of preparing fluorescent alkaline earth metal fluorophosphate which comprises the steps of preparing an aqueous solution of alkaline earth metal nitrate, adding thereto ammonium fluoride to react with part of said alkaline earth metal and form therewith an insoluble fluoride, adding an aqueous dispersion of compound of at least one activator metal of the group consisting of antimony, bismuth, tin and lead and mixtures of at least one said metal with manganese, adding thereto ammonium phosphate to precipitate a phosphate of said alkaline earth metal and bring down therewith the said insoluble alkaline earth metal fluoride and compound of said activator metal, filtering the resultant mixture, drying and crushing the filtrate to a fine powder, and firing the mixture at a temperature of approximately 1000–1150° C.

3. The method of preparing fluorescent alkaline earth metal fluorophosphate which comprises the steps of preparing an aqueous solution of alkaline earth metal nitrate, adding thereto ammonium fluoride to react with part of said alkaline earth metal and form therewith an insoluble fluoride, adding an aqueous dispersion of compounds of at least one main activator metal of the group consisting of antimony, bismuth, tin and lead together with supplemental manganese, adding thereto ammonium phosphate to react with further amounts of the said alkaline earth metal and with said manganese compound to precipitate phosphates thereof and bring down therewith the said insoluble earth metal fluoride and compound of said main activator metal, drying and crushing the resultant precipitate to a fine powder, mixing the said powder with sufficient carbonate of said alkaline earth metal to give the corresponding orthophosphate upon ignition, and firing the mixture at a temperature of approximately 1000–1150° C. in an atmosphere of nitrogen.

4. The method of preparing fluorescent alkaline earth metal fluorophosphate which comprises the steps of preparing an aqueous solution of an alkaline earth metal nitrate, adding thereto ammonium fluoride to react with part of said alkaline earth metal and form therewith an insoluble fluoride, adding an aqueous suspension of antimony oxide and a solution of manganese nitrate as activator compounds, adding ammonium phosphate to react with further amounts of the said alkaline earth metal and with the said manganese nitrate to precipitate a manganese phosphate and phosphate of the said alkaline earth metal and bring down therewith said insoluble fluoride and said antimony oxide, drying and crushing the resultant precipitate to a fine powder, mixing the said powder with sufficient carbonate of said alkaline earth metal to give the corresponding orthophosphate upon ignition, and firing the mixture at a temperature of approximately 1000–1150° C. in an atmosphere of nitrogen.

5. The method of preparing fluorescent calcium fluorophosphate which comprises reacting the following ingredients in approximately the proportions stated; dissolving 240 g. calcium nitrate (4H$_2$O) in 700 cc. of water, adding a hot solution of 9–11.5 g. of NH$_4$F to form colloidal CaF$_2$, adding an aqueous suspension of 4 g. of Sb$_2$O$_3$ and about 15 to 25 cc. of manganese nitrate solution, adding a hot solution of 110 g. of (NH$_4$)$_2$HPO$_4$ in 700 cc. of water, shaking and filtering the mixture as soon as the precipitate has become crystalline, drying and crushing the filtrate to a fairly fine powder mixing the said powder with 40–50 g. of CaCO$_3$, and firing the mixture at a temperature of approximately 1000–1150° C. in an atmosphere of nitrogen.

HERMAN C. FROELICH.

REFERENCES CITED

The following references are of record in the file of this patent:

UNITED STATES PATENTS

| Number | Name | Date |
|---|---|---|
| 2,187,022 | Flechsig | Jan. 16, 1940 |
| 2,226,407 | McKeag | Dec. 24, 1940 |
| 2,238,026 | Moore | Apr. 8, 1941 |
| 2,289,997 | Renwick | July 14, 1942 |
| 2,302,770 | Henderson | Nov. 24, 1942 |
| 2,306,567 | Roberts | Dec. 29, 1942 |

FOREIGN PATENTS

| Number | Country | Date |
|---|---|---|
| 512,154 | Great Britain | Aug. 30, 1939 |

OTHER REFERENCES

Mellor, Comprehensive Treatise on Inorganic and Theoretical Chemistry, vol. III, pages 896–898.